(12) United States Patent
Yamazaki et al.

(10) Patent No.: US 7,006,257 B1
(45) Date of Patent: Feb. 28, 2006

(54) IMAGE PROCESSING APPARATUS, IMAGE PROCESSING METHOD, AND STORAGE MEDIUM

(75) Inventors: Takeshi Yamazaki, Kanagawa (JP); Junichi Hayashi, Kanagawa (JP); Tomochika Murakami, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 1104 days.

(21) Appl. No.: 09/713,235

(22) Filed: Nov. 16, 2000

(30) Foreign Application Priority Data

Nov. 19, 1999 (JP) .................................. 11/330179
Jan. 31, 2000 (JP) ............................. 2000/021562

(51) Int. Cl.
*G01K 15/00* (2006.01)
(52) U.S. Cl. .................... 358/3.28; 358/1.12; 358/1.14; 358/1.18
(58) Field of Classification Search ............... 358/1.18, 358/1.9, 1.16, 1.15, 3.28, 3.31, 1.12, 1.14, 358/537, 450, 453, 464, 462; 382/173, 181, 382/254, 176, 199, 266; 713/176; 283/113
See application file for complete search history.

(56) References Cited

U.S. PATENT DOCUMENTS

| | | | | |
|---|---|---|---|---|
| 4,586,811 A | * | 5/1986 | Kubo et al. | 399/366 |
| 4,947,269 A | * | 8/1990 | Yamada | 358/448 |
| 5,243,439 A | * | 9/1993 | Jacobus et al. | 358/448 |
| 5,694,228 A | * | 12/1997 | Peairs et al. | 358/538 |
| 6,177,934 B1 | * | 1/2001 | Sugiura et al. | 345/748 |
| 6,608,692 B1 | * | 8/2003 | Shibahara et al. | 358/1.13 |
| 6,697,511 B1 | * | 2/2004 | Haycock | 382/135 |
| 6,918,542 B1 | * | 7/2005 | Silverbrook et al. | 235/494 |
| 2002/0057823 A1 | * | 5/2002 | Sharma et al. | 382/100 |
| 2003/0210804 A1 | * | 11/2003 | Rhoads | 382/100 |
| 2005/0010775 A1 | * | 1/2005 | Hsu | 713/176 |
| 2005/0018845 A1 | * | 1/2005 | Suzaki | 380/243 |
| 2005/0094205 A1 | * | 5/2005 | Lo et al. | 358/1.18 |
| 2005/0160194 A1 | * | 7/2005 | Bango et al. | 710/8 |

* cited by examiner

Primary Examiner—Jerome Grant, II
(74) Attorney, Agent, or Firm—Fitzpatrick, Cella, Harper & Scinto

(57) ABSTRACT

An input step of inputting image information according to an image and a judgment step of judging, for each image data corresponding a predetermined-sized block area in the image information input in the input step, whether or not the image data is a part of a specific image are provided. Further, in the judgment step, the judgment is performed not to the entire image information input in the input step but to a part of the image information.

30 Claims, 15 Drawing Sheets

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium.

2. Related Background Art

In recent years, an electronic equipment such as a personal computer or the like has widely spread, whereby a chance to convert a printed material such as a photograph, a document or the like into digital data and use the obtained digital data increases.

According to this, also fear that a paper money, a security, or a specific printed material (image) having copyright is illegally or falsely digitalized or reprinted increases.

Conventionally, there was strong possibility that such the specific image as above is illegally or falsely printed with an electrophotographic copying machine in which a scanner and a printer are unified.

However, in recent years, a function (resolution or the like) of a popular single scanner or printer increases, whereby it is possible to accurately and vividly copy the printed materials by connecting the single scanner, a personal computer and the single printer with others.

Conventionally, when it is intended to prevent the electrophotographic copying machine or printer which performs the printing in the unit of page from illegally or falsely printing the specific image, the illegal or false printing is detected for each of specific colors in the unit of page. Further, since such detection is generally performed on hardware, there is especially no problem for processing speed.

On the other hand, when it is intended to prevent an inkjet printer represented by the popular single printer from illegally or falsely printing the specific image, there is a case where it is more efficient to detect the illegal or false printing in the unit of partial area. Here, it should be noted that the partial area is obtained by dividing one page and called a band.

However, when it is intended to detect the illegal or false printing in the unit of partial area, there is a problem that time to detect the partial area corresponding to a margin is useless.

Further, when the above detection is performed with software such as a printer driver or the like, control for partial omission of a detection process or the like is very important so as not to decrease or lower processing speed.

Further, when it is intended with the software such as the printer driver or the like to detect the illegal or false printing in the unit of page in such the electrophotographic copying machine as described above, since the sum of operations is large, there is a problem that the processing time required to recognize and judge the illegal or false printing becomes remarkably long.

However, when it is intended to reduce the sum of operations required to recognize and judge the illegal or false printing, it becomes difficult to achieve the detection of the illegal or false printing to which strict recognition accuracy is required. Further, it becomes difficult to detect the illegal or false printing from an image which was read after its reading condition (an original placement angle on an original reading board, an original placement position on this board, or the like) was deliberately changed. Conversely, when an image which looks like a paper money (since this image is not the paper money, it can be legally copied) is input, there is some fear that such the input image is erroneously recognized as a copy prohibition image and thus not output normally, whereby a function as an original image processing system is ruined.

SUMMARY OF THE INVENTION

An object of the present invention is to provide an image processing apparatus, an image processing method and a storage medium which can resolve such disadvantage as described above.

On the basis of the above object, one preferred embodiment of the present invention comprising: an input step of sequentially inputting image data corresponding to plural partial areas obtained by dividing one-page image; a judgment step of judging whether the input image data corresponds to a margin area or a non-margin area; a detection step of detecting whether or not the image data corresponding to the non-margin area represents at least a part of a specific image; and a control step of controlling printing output of the image data corresponding to the non-margin area, in accordance with the detected result in the detection step.

Further, on the basis of the above object, one preferred embodiment of the present invention comprising: an input step of inputting image information according to an image; a block selection step of selecting, in the image information input in the input step, the image information of a block having a predetermined size; a specific image judgment step of judging whether or not the input image corresponds to a specific image having a predetermined feature, in accordance with the image information of the block; and a process step of processing the input image in accordance with the judged result in the specific image judgment step.

Further, on the basis of the above object, one preferred embodiment of the present invention comprising: an input step of inputting image information according to an image; and a judgment step of judging, for each image data corresponding a block area of a predetermined size in the image information input in the input step, whether or not the image data is a part of a specific image, wherein the judgment step performs the judgment not to the entire image information input in the input step but to a part of the image information.

Further, on the basis of the above object, one preferred embodiment of the present invention comprising: an input step of inputting image information according to an image; and a judgment step of judging, for each image data corresponding a block area of a predetermined size in the image information input in the input step, whether or not the image data is a part of a specific image, wherein the judgment step performs the judgment not to the entire image information input in the input step but to a part of the image information, by periodically judging each block area.

Other objects and features of the present invention will become apparent from the following detailed description and the attached drawings.

DETAILED DESCRIPTION OF THE PREFERRED EMBODIMENTS

First Embodiment

Figure 1:
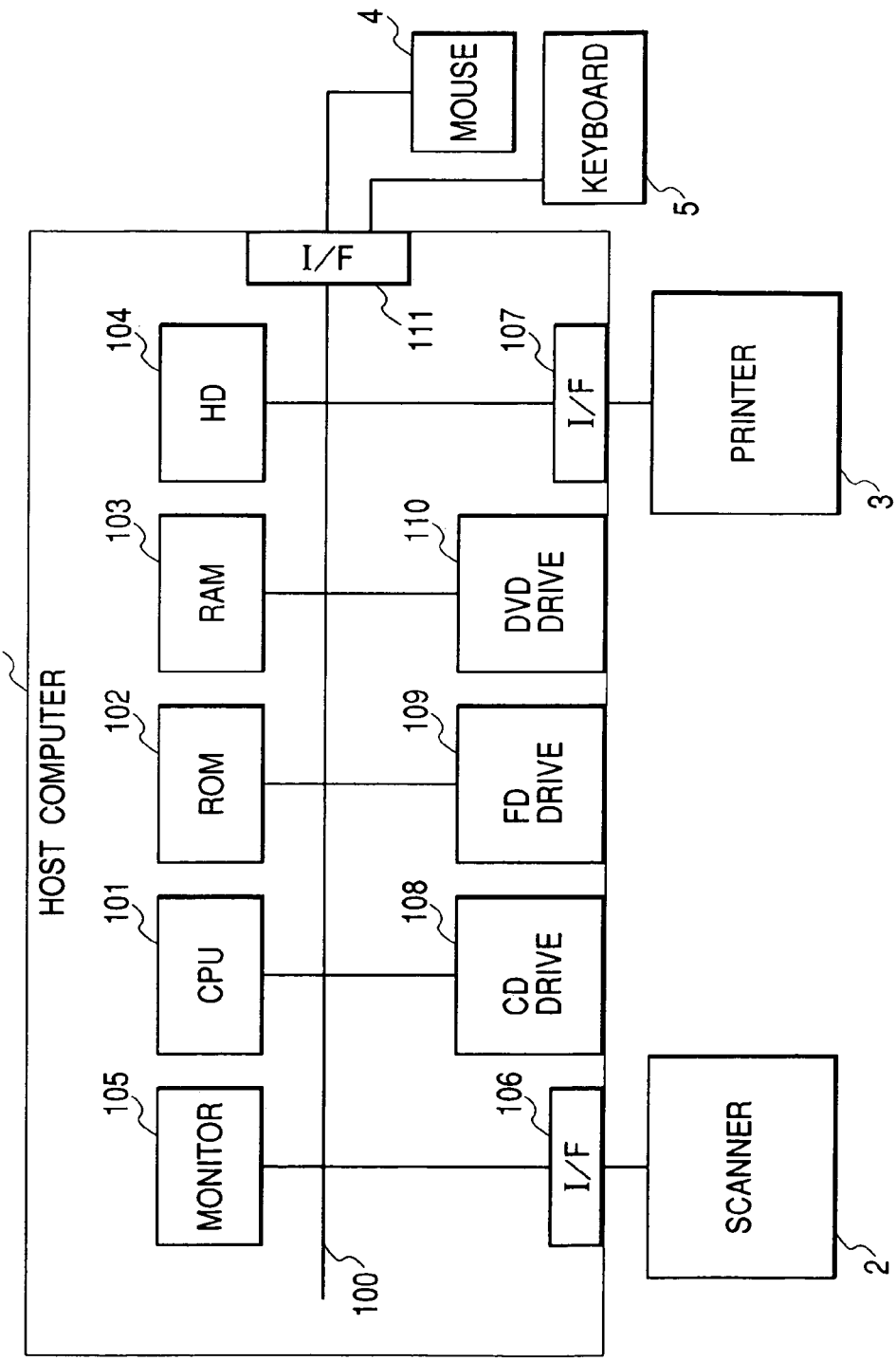
FIG. 1 is a block diagram showing an image processing system which is applicable to the first embodiment.

FIG. 1 is a block diagram showing an image processing system which is applicable to the first embodiment.

In FIG. 1, a host computer 1 which is, e.g., a widespread personal computer can input, process, edit, and store an image read by a scanner 2. Further, the image obtained from the host computer 1 can be printed by a printer 3. Various manual instructions and the like by a user can be input through a mouse 4, a keyboard 5 and the like. In the host computer 1, respective blocks are connected to others through a bus 100, whereby various data can be exchanged.

In FIG. 1, numeral 101 denotes a CPU which can control an operation of each block in the personal computer 1 and execute an internally stored program. Numeral 102 denotes a ROM which stores specific images to which printing is not authorized, and previously stores necessary image processing programs and the like. Numeral 103 denotes a RAM which temporarily stores the programs and the image data to be processed, for the process by the CPU. Numeral 104 denotes a hard disk (HD) which can previously store the programs and the image data to be transmitted to the RAM and the like, and store the processed image data. Numeral 105 denotes a monitor which can display a processing condition while the various programs are being executed, and display the image data before and after the various processes. Numeral 106 denotes a scanner interface (I/F) which is connected to the scanner for reading an original, a film and the like with a CCD to generate image data. The image data obtained by the scanner can be input through the scanner I/F 106. Numeral 107 denotes a printer interface (I/F) which is connected to the printer 3 capable of printing the image data held in the host computer. The image data can be output to the printer 3 through the printer I/F 107. Numeral 108 denotes a CD (compact disc) drive by which data stored in a CD (or a CD-R (compact disc recordable)) being one of external memory media can be read and written. Numeral 109 denotes an FD (floppy disk) drive by which data stored in an FD can be read and written. Numeral 110 denotes a DVD (digital versatile disk) drive by which data stored in a DVD can be read and written. When an image editing program or a printer driver has been stored in the CD, the FD, the DVD or the like, the stored program is read and installed on the HD 104, and the transferred to the RAM 103 if necessary. Numeral 111 denotes an interface (I/F) which is connected to the mouse 4 and the keyboard 5 to receive input instructions therefrom.

In the above system, an operation that the original is read to obtain the image, the obtained image is processed and edited, and the processed and edited image is printed will be briefly explained with reference to FIG. 2.

First, in a step S201, the original is read by the scanner 2, and color image data composed of eight bits for each of R (red), G (green) and B (blue) components is generated. Next, in a step S202, the color image data is input to the host computer 1 through the scanner I/F 106, and the input data is temporarily stored in the HD 104.

In a step S203, it is judged whether or not an instruction to perform image editing is issued. If judged that such the image editing instruction is issued from the mouse 4 or the like, the flow advances to a step S204 to execute the image editing program. Conversely, if judged that the image editing instruction is not issued, the flow advances to a step S205.

In the step S204, the image editing program is executed by the CPU 101. In this case, it is assumed that the program itself to be used has been stored in the ROM 102 or the RAM 103. Further, it should be noted that the program can be transferred from the HD 104 to the RAM 103 if necessary. Further, it is possible to install on the HD 104 the program prestored in the CD, the FD, the DVD or the like, and then read and use the installed program. In the image editing process, enlargement, reduction, synthesis of another image, cutout, color conversion and the like are performed to the image represented by the color image data. Then, the obtained color image data is again stored in the HD 104.

In the step S205, it is judged whether or not an instruction to perform printing is issued. If judged that such the printing instruction is issued from the mouse 4 or the like, the flow advances to a step S206 to operate the printer driver. Conversely, if judged that the printing instruction is not issued, the flow returns to the step S203 to stand by until the image editing instruction is input. It is possible to release such a standby state according to a certain time or interruption of another process.

In the step S206, the printer driver is executed by the CPU 101. In this case, it is assumed that the program itself of the used printer driver has been stored in the ROM 102 or the RAM 103. It should be noted that the program can be transferred from the HD 104 to the RAM 103 if necessary. Further, it is possible to install on the HD 104 the program prestored in the CD, the FD, the DVD or the like, and then read and use the installed program.

In the printer driver, the color image data being the printing object stored in the HD 104 is divided into plural units of data (called bands hereinafter) for printing, and it is judged whether or not the color image data of each band corresponds to the illegal or false printing. If judged that the color image data does not correspond to the illegal or false printing, this data is subjected to color space conversion (RGB/YMCK conversion), a halftone process (binarization) and the like, and then transferred to the printer 3 through the printer I/F 107.

Then, in a step S207, the color image data of each band transferred from the host computer through the printer I/F 107 is printed sequentially by the printer 3. In the first embodiment, it is assumed that the printer 3 is the inkjet printer which performs the printing for each band composed of plural main scan lines.

Next, the operation of the printer driver will be explained in detail with reference to FIG. 3.

Figure 2:
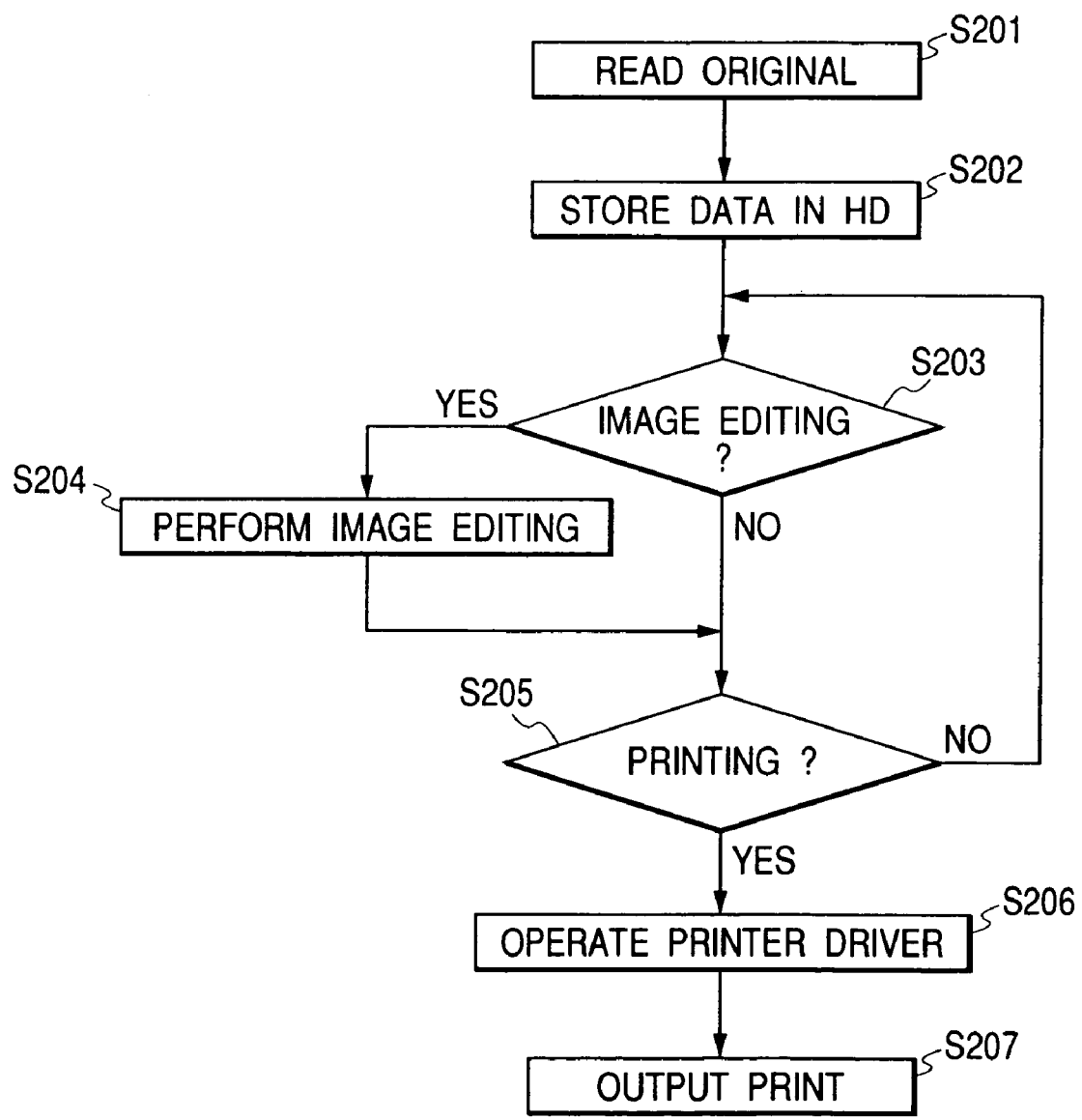
FIG. 2 is a flow chart showing an operation in a case where an original copying process is performed with the system of FIG. 1.
Figure 3:
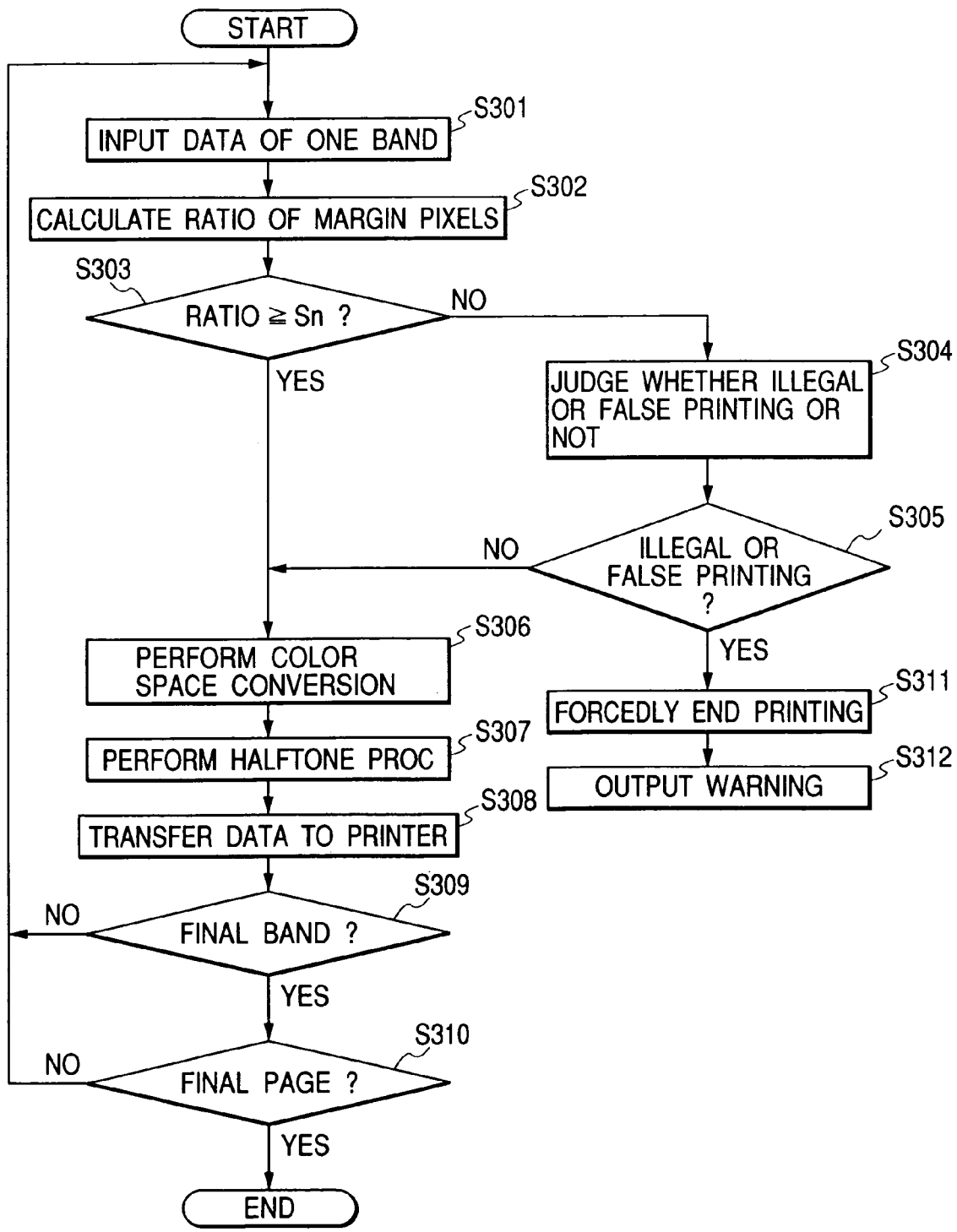
FIG. 3 is a flow chart showing an operation of a printer driver.

First, in the step S206 of FIG. 2, the operation of the printer driver shown in FIG. 3 is started. In a step S301, R, G and B color image data corresponding to the first band on the first page are input.

Next, in a step S302, a ratio of margin (or blank) pixels within this band is calculated. Here, when R, G and B components of one pixel all represent achromatic color (R, G, B=0 or 255), this pixel is defined as the margin pixel. Thus, the number of the margin pixels is counted.

Next, in a step S303, it is judged whether or not the ratio of the margin pixels (or the margin areas) in all the pixels constituting one band is equal to or larger than a threshold Sn. If judged that the ratio of the margin pixels is equal to or larger than the threshold Sn, the flow advances to a step S306, while if judged that the ratio of the margin pixels is less than the threshold Sn, the flow once advances to a step S304 to judge whether or not the illegal or false printing is being performed.

Figure 4:
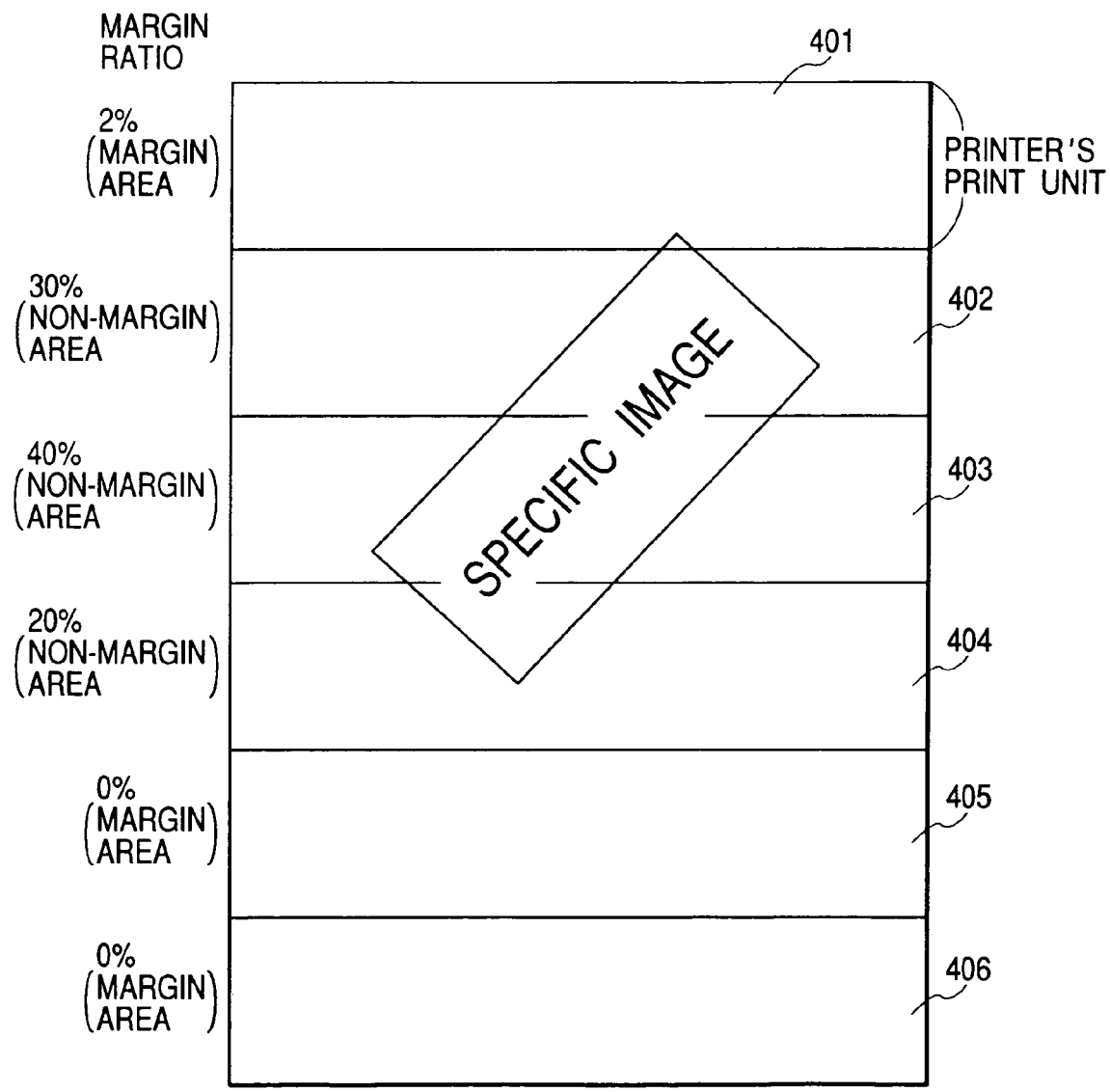
FIG. 4 is a diagram showing an example of an image which is the object of printing.

FIG. 4 shows a state of an image which is represented by the color image data of one page being the printing object. In FIG. 4, each of numerals 401 to 406 denotes the print unit (i.e., the band) which is printed by the printer 3. The bands 401 to 404 include a specific image which must not be printed, but the bands 405 and 406 do not at all include any specific image.

Conventionally, the object (or the target) to which it is judged whether or not the specific image is printed includes all the bands of one image data. However, in the present embodiment, a part of such a judgment process is omitted. Namely, it is controlled not to perform the judgment process to the bands 405 and 406 each of which corresponds to the margin area completely, and also to the band 401 which can be considered to substantially correspond to the margin area. Namely, since the threshold Sn is set to "10%", the bands 401, 405 and 406 are considered to correspond to the margin areas, and the bands 402 to 404 are considered to correspond to the non-margin areas.

For this reason, in the step S303, when the ratio of the margin area is less than the threshold Sn, the judgment process is not performed, and it is controlled to quickly perform known printing processes (color space conversion and a halftone process) to the band in question. Thus, it is possible to shorten a useless judgment time, and thus improve entire printing speed.

It should be noted that it is necessary to change the threshold Sn according to the size of the image to be printed. Namely, when the size of the image (the color image data) to be printed is large, it is necessary to set the threshold Sn to have a small value. Conversely, when the size of the image is smaller than the specific image, it is necessary to set the threshold Sn to have an extremely large value.

Next, in the step S304, it is detected whether or not at least a part of the specific image (a paper money, a security, or an image having copyright, or the like) which is not authorized to be printed is included in the band to be processed. Here, various methods can be thought to detect such the specific image.

For example, the specific image is divided into plural parts, and such the plural parts are previously stored in the ROM 102. Then, it is judged whether or not the part of the input color image data of each band represents any of the stored plural parts, whereby the illegal or false printing can be detected.

On the other hand, predetermined electronic watermark information (representing a kind of paper money, a kind of security, a credit or the like) is previously embedded repeatedly on the entirety of the specific image. Then, it is judged whether or not a predetermine number or more of embedded electronic watermarks (information) can be extracted, whereby the illegal or false printing can be detected.

In a step S305, it is controlled based on the detection result of the step S304 whether or not a following printing process should be performed. Namely, when it is detected that at least a part of the specific image is not included in the band being the processing object, the flow advances to the step S306 to perform the color space conversion for the printing. Conversely, when it is detected that at least a part of the specific image is included in the band, the flow advances to a step S311 to forcedly stop the following printing process (i.e., the process to transfer the data of the band being the processing object and the data of the following bands to the printer 3). Then, in a step S312, a warning "illegal or false printing is being performed" is displayed on the monitor 105, and a warning sound is output from a speaker in the host computer 1 or the printer 3.

In the step S306, the input color image data is subjected to the color space conversion. In the first embodiment, the color image data composed of eight bits for each of the R, G and B components is converted into color image data composed of eight bits for each of Y (yellow), M (magenta), C (cyan) and K (black) components.

In a step S307, the input color image data composed of eight bits for each of the Y, M, C and K components is subjected to the halftone process in a known dither method or a known error diffusion method, and thus converted into color image data composed of one bit for each of the Y, M, C and K components.

In a step S308, the printing color image data of one band which was subjected to the halftone process is transferred to the printer 3 which performs the printing in the unit of band.

In a step S309, it is judged whether or not the band being the processing object (or the band in question) is the final band in one page. If judged that the band being the processing object is the final band, the flow advances to a step S310, while if judged that the band being the processing object is not the final band, the flow returns to the step S301 to input the color image data of the next band.

In the step S310, it is judged whether or not the page including the band being the processing object is the final page. If judged that the page in question is the final page, the process of the printer driver ends, while if judged that the page in question is not the final page, the flow returns to the step S301 to input the color image data of the first band in the next page. By the above, the process of the printer driver is performed.

It should be noted that the printer driver process in the step S206 and the printing output process by the printer 3 in the step S207 are performed almost in parallel.

According to the present embodiment explained as above, when the illegal or false printing is detected in the unit of band being the unit of transfer to the printer or the unit of process by the printer driver, the existence of the margin area is judged in the unit of band, and only the necessary bands are subjected to the illegal printing detection process. Thus, it is possible to maintain substantial data transfer speed to the printer at a high level as much as possible.

Although the present embodiment is described on the assumption of being performed by the software process in the computer, the present invention is not limited to this. Namely, the present invention includes a case where the present embodiment is realized by an image processing apparatus performing the processes in FIGS. 2 and 3.

Further, the present invention is not limited to the method and the apparatus which perform the processes for obtaining the above effect. Namely, the present invention includes a storage medium itself which stores the program to perform the above processes. Namely, in a case where the host computer 1 reads the program (printer driver) with the CD drive 108, the FD drive 109, the DVD drive 110 or the like shown in FIG. 1, installs the read program in the HD 104 or the like, and then performs the above processes by the installed program, the storage medium such as the CD, the FD, the DVD or the like which is readable by the above corresponding drive is included in the present invention.

As explained above, according to the present invention, when the illegal or false printing is detected in the unit of the partial area which is obtained by dividing the one page, it is possible to perform the detection as quick as possible in consideration of the existence of the margin area.

Second Embodiment

In the above first embodiment, when the illegal or false printing is detected in the area provided in the unit of process of the printer driver or the unit of band being the unit of transfer to the printer, only the band judged as the non-margin area is subjected to the illegal printing detection with use of the electronic watermark. On the other hand, in the second embodiment, the illegal printing (i.e., the electronic watermark) is detected in the unit of predetermined-sized block area. Here, the unit of predetermined-sized block area is included in the unit of band, and such the size is smaller than the size of the unit of band.

Hereinafter, as the second embodiment, a case where information representing a copy prohibition object (or target) included in an original is created with a technique called "electronic watermark" will be explained. Namely, the explanation premises that the original which is the copy prohibition object is created as the printed material from copy prohibition object information added image data (i.e., electronic image information) which is created by embedding second digital information representing the copy prohibition object in image data (i.e., electronic image information) being first digital information becoming the origin as the printed material. It should be noted that an invisible electronic watermark created by embedding information in a specific spatial frequency of the image data, a visible electronic watermark created by embedding information in an arrangement of yellow (yellowish) dots not easily seen by human eyes, or the like can be used as the electronic watermark.

As described above, in order to extract the electronic watermark data embedded in the electronic watermark technique, generally, it is necessary to conform reading and extracting conditions with the condition at the time when the printed material including the watermark information was produced (i.e., in what arrangement and at which position on the image data the watermark information is embedded).

Figure 5:
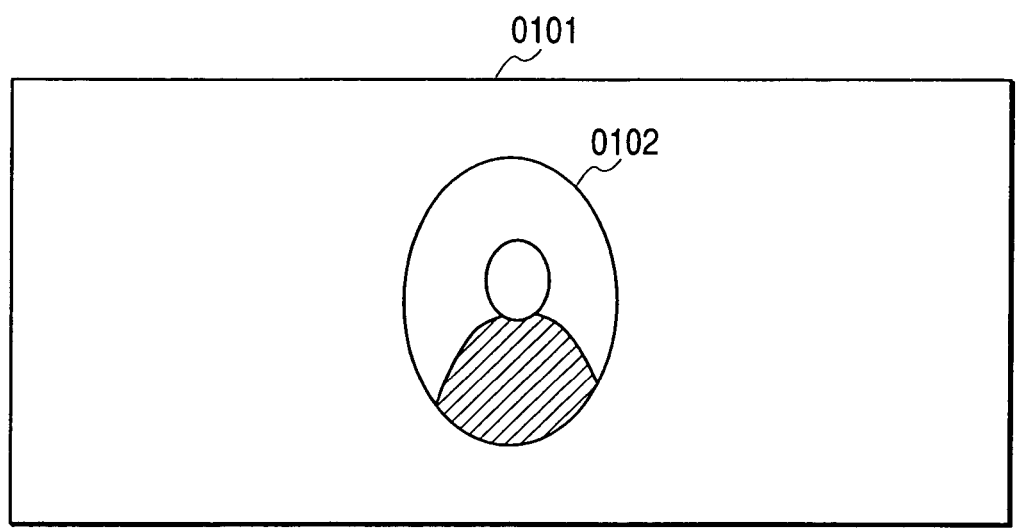
FIG. 5 is a diagram showing a paper money which is an example of a copy prohibition object.

FIG. 5 shows a paper money which is one kind of the copy prohibition object. In the drawing, numeral 0101 denotes an entire paper money, and numeral 0102 denotes an area in which the watermark to judge whether or not the paper money 0101 is a counterfeit paper money has been embedded. Here, it is assumed that the information for judging whether or not the object is the copy prohibition object has been embedded in the entire paper money 0101 according to the electronic watermark technique.

Figure 6:
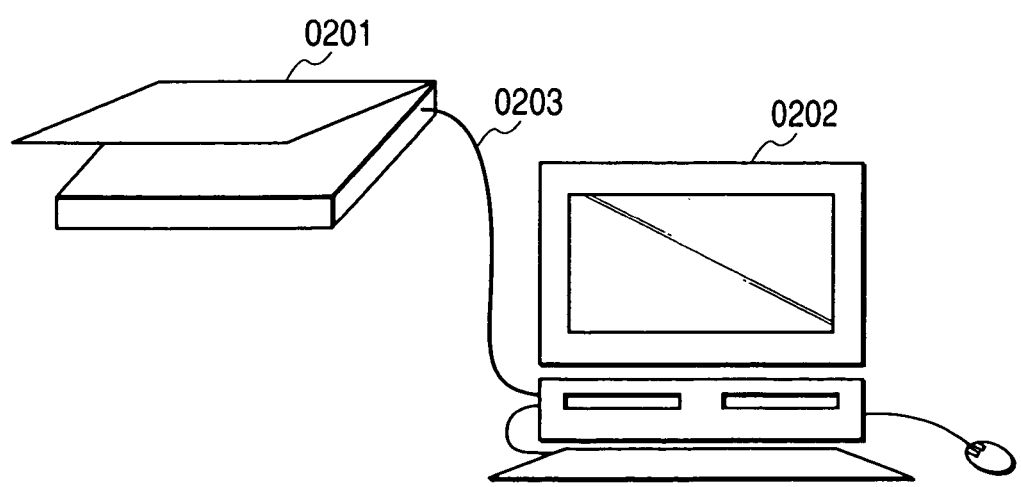
FIG. 6 is a diagram showing an example of the image processing system in the embodiment.

FIG. 6 shows an environment that extraction of the copy prohibition object is supposed.

In FIG. 6, numeral 0201 denotes a color image scanner which acts as an image input apparatus, numeral 0202 denotes a personal computer which acts as a computer system, and numeral 0203 denotes a connection cable by which data is exchanged between the color image scanner 0201 and the computer system 0202.

Figure 7:
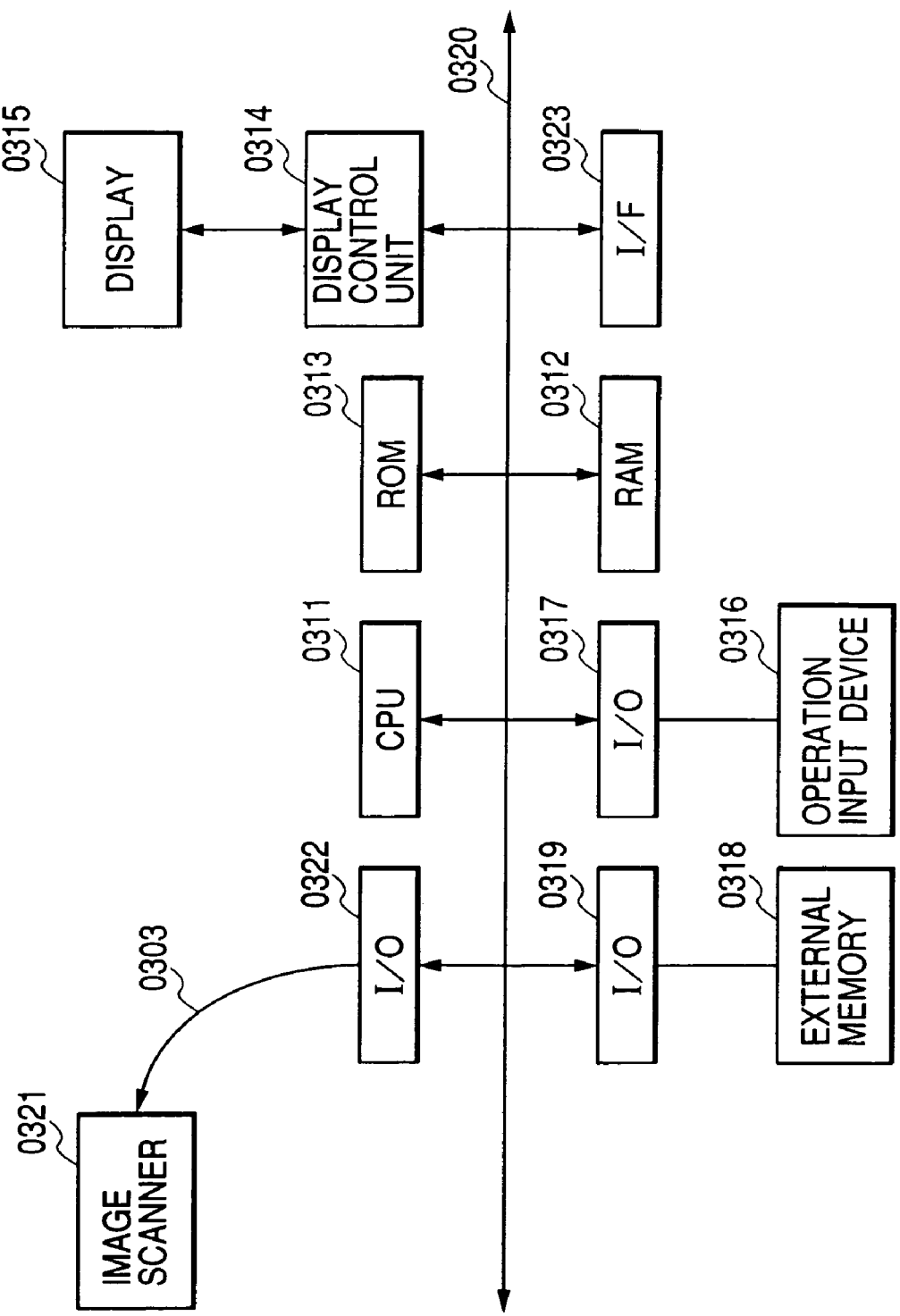
FIG. 7 is a block diagram showing the structure of the main part of FIG. 6.

FIG. 7 is a block diagram showing the main part of the structure of FIG. 6 with blocks acting as function modules. In FIG. 7, numeral 0311 denotes a CPU, numeral 0312 denotes a RAM, numeral 0313 denotes a ROM, numeral 0314 denotes a display control unit, numeral 0315 denotes a display, numeral 0316 denotes an operation input device such as a keyboard or a mouse, numeral 0317 denotes a connection input/output port (I/O) for the operation input device 0316, numeral 0318 denotes an external memory such as a hard disk or the like, numeral 0319 denotes a connection I/O for the external memory 0318, numerals 0320 and 0303 denote buses, numeral 0321 denotes a color image scanner, numeral 0322 denotes a connection I/O for an external input apparatus such as the image scanner 0321, and numeral 0323 denotes an interface unit (I/F) for a communication means such as a network or the like.

In a system proposed in the second embodiment, when the copy prohibition object is input through the image scanner, it is judged whether or not the input object is the copy prohibition object. Then, the image input is stopped when the input object is judged to be the copy prohibition object, while the image input is continued when the input object is judged not to be the copy prohibition object.

Figure 9:
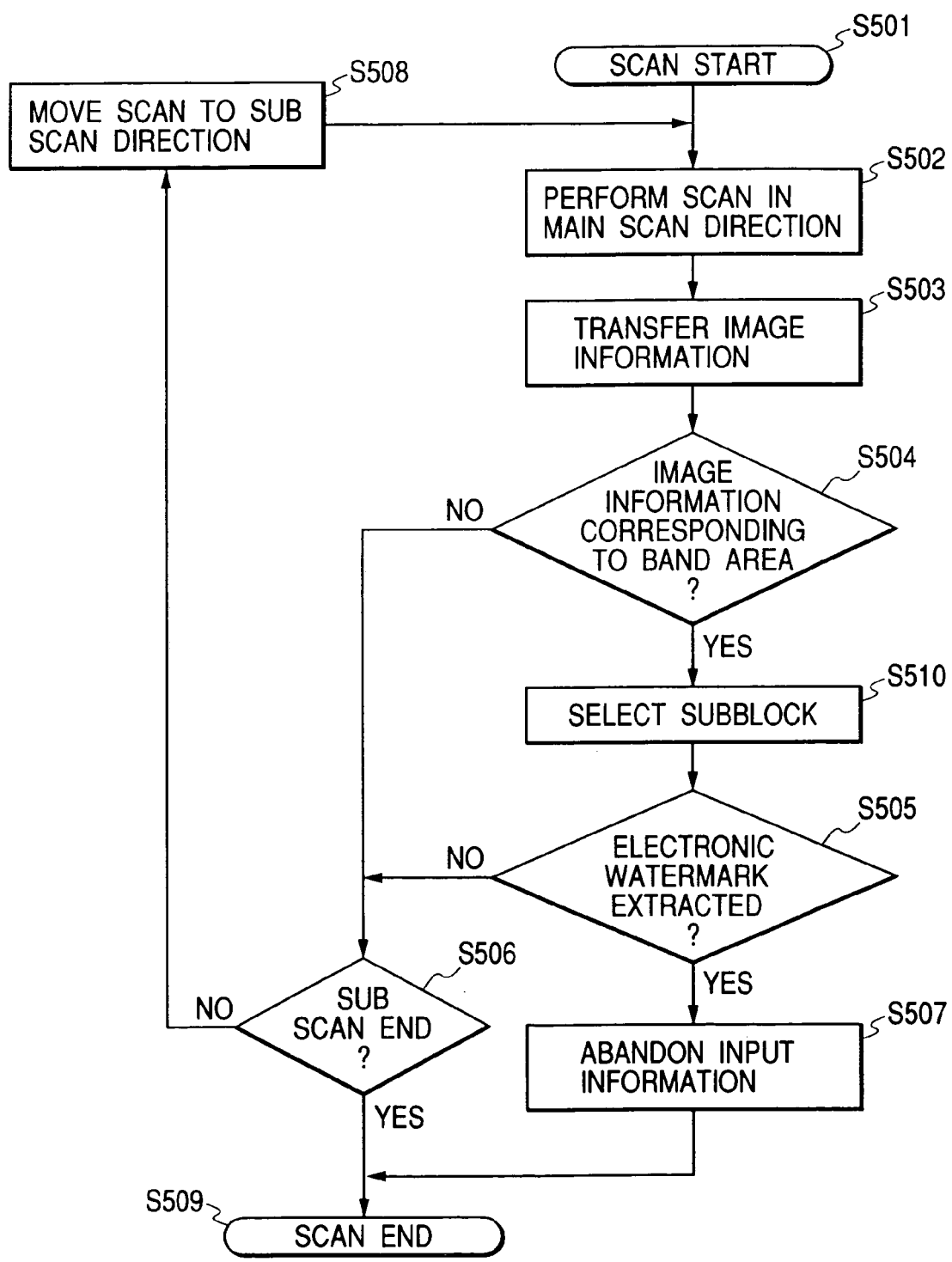
FIG. 9 is a flow chart showing an operation procedure in the second embodiment.

FIG. 9 is a flow chart showing an operation procedure to perform the process on the structure shown in FIGS. 6 and 7. A computer-executable program which describes the procedure shown in FIG. 9 is previously stored in the ROM 0313, and then the stored program is executed by the CPU 0311 (a software process) to perform the process. Alternatively, a program which has been previously stored in the external memory 0318 is read onto the RAM 0312, and then this program is executed by the CPU 0311 to perform the process. In this case, the scanner driver corresponds to the above program.

First, how to capture the image by the image scanner 0201 will be explained. Here, as the image scanner 0201, a flatbed scanner which is most general in the consumer market will be explained by way of example. It is obvious from the following explanation to be able to apply the present embodiment to other kinds of scanners.

Figure 8:
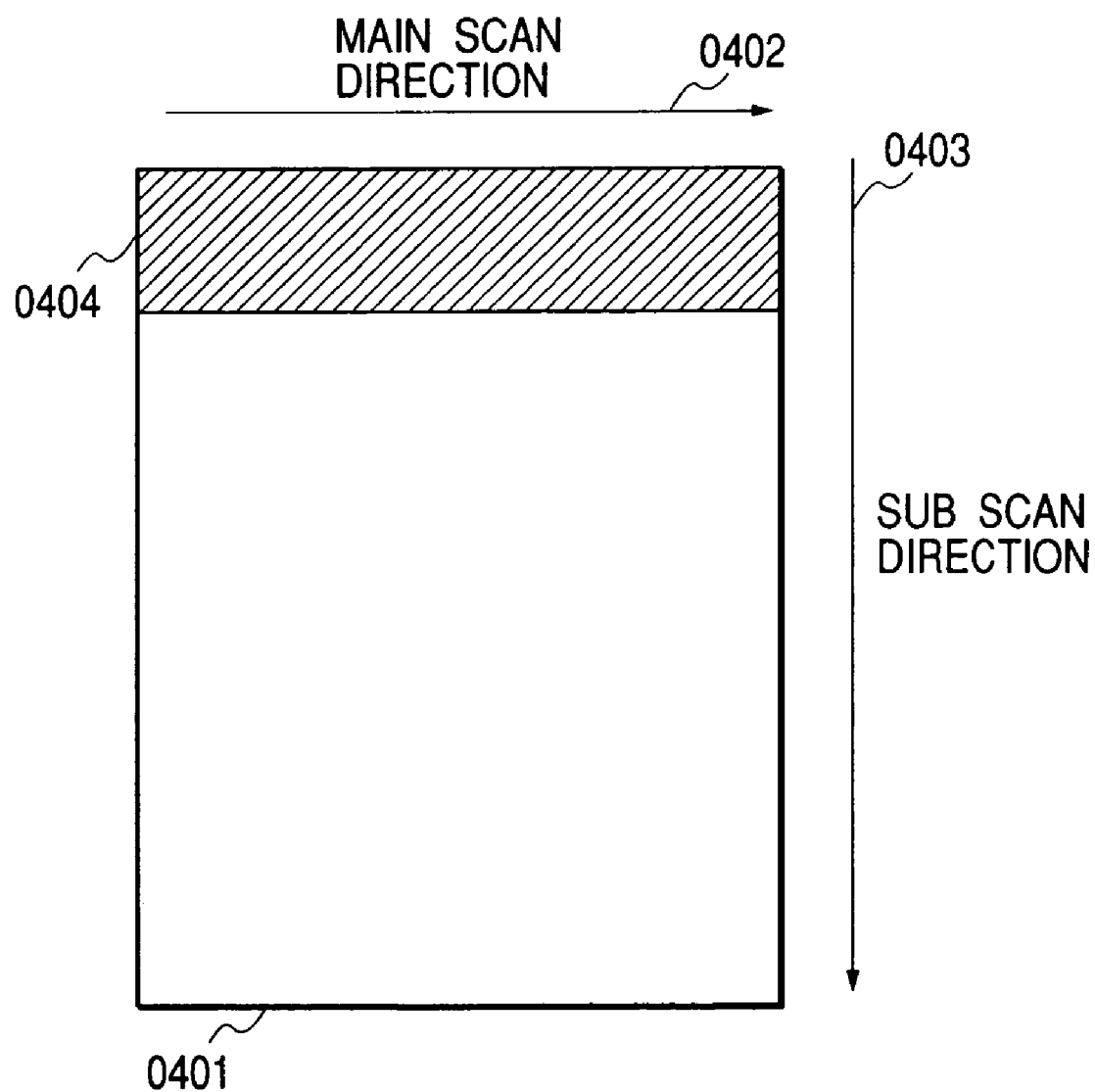
FIG. 8 is a diagram for explaining an image capture operation on an image scanner.

One line of an original put on an original mounting board 0401 of the image scanner shown in FIG. 8 is irradiated by a light source disposed inside the scanner, along a main scan direction 0402. Then, reflection light from the original is input to a CCD sensor through a mirror and a lens all disposed inside the scanner. The intensity of the input light is converted into numerical data by the CCD sensor, whereby the reading of the lateral one line (main scan) ends.

After then, the mirror and the light source are moved in a sub scan direction 0403 little by little, and thus the same main scan is repeated. Such the information reading of the original lateral direction (the main scan direction 0402) is repeated times corresponding to the longitudinal direction, whereby the reading of the entire original is performed.

In the second embodiment, the above scan is repeated by the image scanner 0321, whereby the image information is stored in the RAM 0312 through the connection I/O 0322. In the computer 0202, every time a band area 0404 which has the length of the CCD sensor movement direction (main scan direction) and a certain width along the light source and mirror movement direction (sub scan direction) is input to the RAM 0312, the electronic watermark information is extracted by running the program with the CPU 0313.

FIG. 9 is the flow chart showing such a series of processes. When the scan is started in a step S501, the image scanner scans the original in the main scan direction in a step S502. After then or in parallel, the image information is transferred to the RAM 0312 through the connection I/O 0322 in a step S503. In a step S504, it is judged whether or not the image information corresponding to the band area is newly input to the RAM 0312.

If judged in the step S504 that the image information corresponding to the band area is newly input, the flow advances to a step S510 to select a subblock by which the electronic watermark is further subtracted from the band area. Then, in a step S505, the electronic watermark is extracted from the subblock selected in the step S510.

A subblock selection means for selecting such the subblock will be later explained in detail.

Conversely, if judged in the step S504 that the image information corresponding to the band area is not input, the flow advances to a step S506 to judge whether or not it is necessary to advance in the sub scan direction and perform the scan (i.e., whether or not the scan for the entire original mounting board ends).

If judged in the step S506 that it is not necessary to advance in the sub scan direction and perform the scan, the flow advances to a step S509 to end the scan. Conversely, if judged that it is necessary to advance in the sub scan direction and perform the scan, the flow advances to a step S508. In the step S508, the scan is moved in the sub scan direction, and the flow returns to the step S502.

In the case where the electronic watermark is extracted in the step S505, when the electronic watermark information representing the copy prohibition object is extracted, the flow advances to a step S507 to immediately abandon or cancel the image information input in the RAM 0312, and the scan ends in the step S509.

In the case where the electronic watermark is extracted in the step S505, when the electronic watermark information representing the copy prohibition object is not extracted, the flow advances to the step S506. Then, when the original scan ends, the flow advances to the step S509 to end the scan.

If judged in the step S506 that the original scan does not end, the flow advances to the step S508 to move the light source in the sub scan direction, and then the flow returns to the step S502.

By the series of processes described as above, it is possible to input the image by using the color image scanner and simultaneously judge whether or not the input image corresponds to the copy prohibition object, and further it is possible to stop the process if it is judged that the input image corresponds to the copy prohibition object.

Next, the subblock selection means for selecting the area from which the electronic watermark is extracted in the step S510 will be explained in detail.

Figure 10:
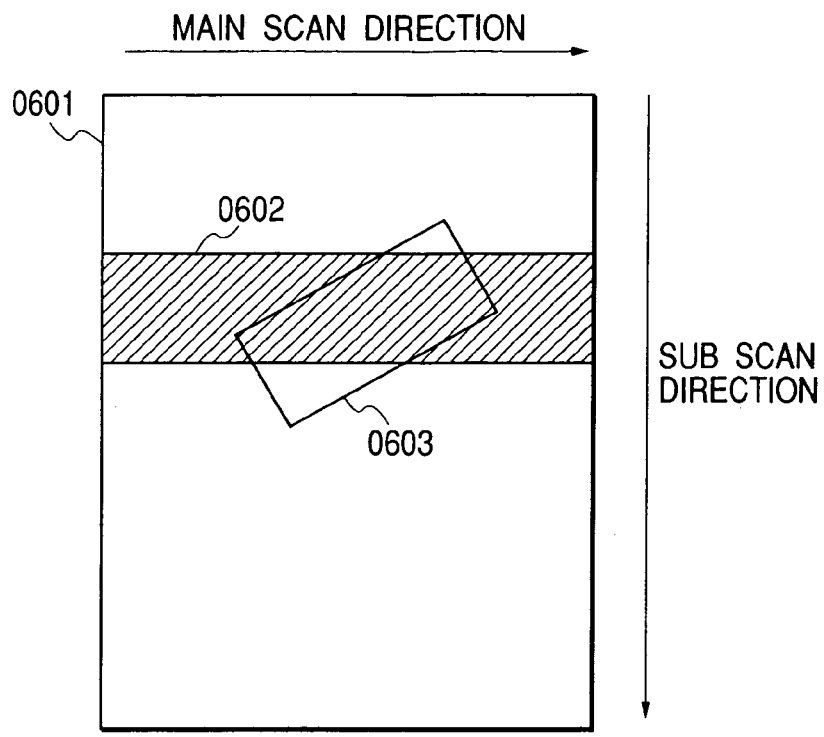
FIG. 10 is a diagram for explaining detection of a copy prohibition object in the second embodiment.

FIG. 10 shows a state that a copy prohibition object 0603 is put on an original mounting board 0601 of the image scanner, and image information is read from the object 0603. Here, the information representing that it is prohibited to copy the image has been embedded on the entirety of the copy prohibition object 0603 in the electronic watermark technique. Incidentally, the electronic watermark has been embedded at a certain period on the copy prohibition object 0603. Numeral 0602 denotes a band area which is used to judge whether or not the image corresponds to the copy prohibition object. Every time the image information which meets the capacity of the band area is newly input, the electronic watermark is extracted by the CPU 0311 from the image information of the band area stored in the RAM 0312 of FIG. 7.

Ordinarily, when it is strictly judged whether or not the image corresponds to the copy prohibition object, the most reliable method is to perform the extraction process to all the image information in the band area 0602 from which the electronic watermark should be extracted.

However, when the electronic watermark extraction process is actually performed to all the image information of the band area, the light source and the mirror are not moved in the sub scan direction until the electronic watermark extraction process ends, whereby it is forecast that the image scan speed decreases.

In the second embodiment, there is proposed the method to strictly judge whether or the image corresponds to the copy prohibition object and simultaneously not to decrease the image scan speed.

Figure 11:
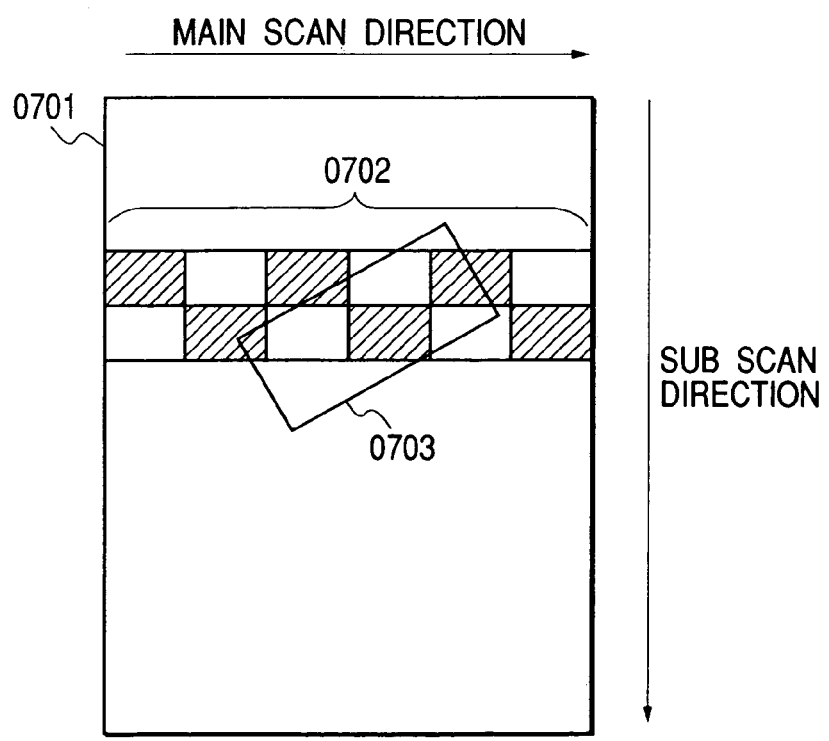
FIG. 11 is a diagram for explaining efficient detection of the copy prohibition object in the second embodiment.

FIG. 11 shows a state that, in the band area from which the electronic watermark should be extracted, subblocks 0702 arranged like checkers are set as the electronic watermark extraction areas, and the extraction process (i.e., electronic watermark judgment) is performed only to the subblocks 0702. It is preferable for each of the subblocks 0702 constituting the checkers to have the minimum size from which the electronic watermark can be extracted. It is thought that the size of the subblock is different according to an electronic watermark system and an electronic watermark size. In any case, it is thought that an enough number of subblocks are included in the copy prohibition object.

As apparent from FIG. 11, even when a copy prohibition object 0703 is inclined on an original mounting board 0701 and input, the subblocks necessary to extract the electronic watermarks can be obtained from the object 0703, whereby it is possible to efficiently judge the object 703 to be the copy prohibition object. As above, by performing the electronic watermark extraction process only to the subblocks, it is possible to reduce the processing time when the extraction process is performed by the software.

Further, by selecting the subblocks at the certain period like the checkers, the accuracy in judging whether or not the object in question corresponds to the copy prohibition object can be made equal for the entire image. Namely, it is possible to prevent the problem that the accuracy of a certain partial area of the image is extremely lower than the accuracy of the other area thereof.

In the band area from which the electronic watermark should be extracted, the same effect can be obtained not only in the case where the subblocks are selected from the pattern like the checkers, but also in a case where the subblocks are dispersedly arranged and selected.

Figure 12:
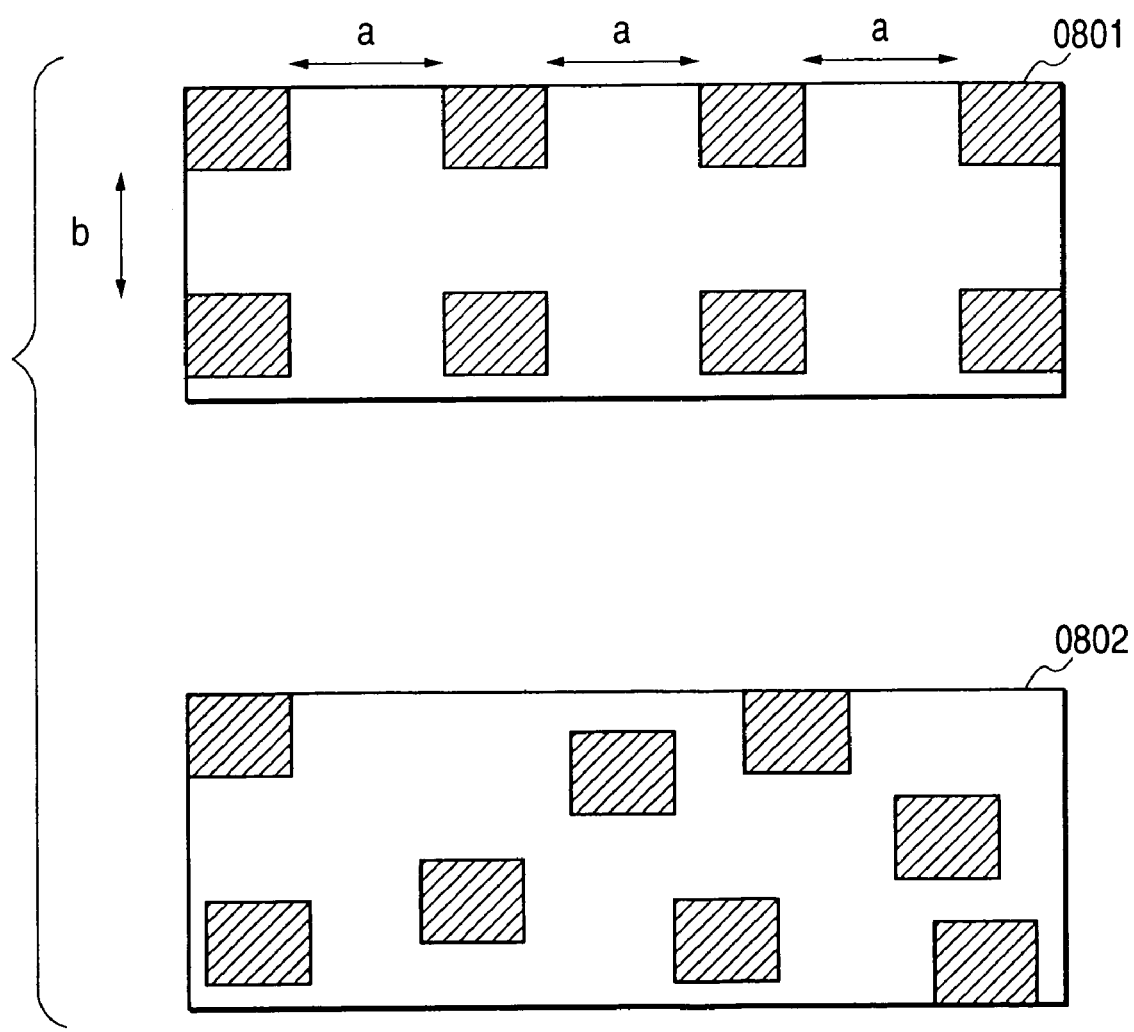
FIG. 12 is a diagram showing detection areas which are used to efficiently detect the copy prohibition object in the second embodiment.

Next, the example that the subblocks are dispersedly arranged will be explained. In FIG. 12, numeral 0801 denotes the case where the subblocks are arranged at a certain interval "a" in the main scan direction and a certain interval "b" in the sub scan direction. Numeral 0802 denotes the case where the subblocks are arranged at random. It is obvious that both the cases are effective in the state that the copy prohibition object is inclined and put on the original mounting board of the image scanner.

The present embodiment is not limited to such the methods as above. Namely, the present embodiment also includes various kinds of methods in which the subblocks used for electronic watermark extraction are dispersedly arranged to be suitable to extract the electronic watermark intended to be extracted, it is judged based on such the arrangement whether or not the detected object is the copy prohibition object, the scan is controlled according to the judged result, and simultaneously the decrease in scan speed is prevented as much as possible.

As above, according to the present embodiment, the subblocks are selected from the block, and the electronic watermark is extracted from the selected subblocks. Thus, it is possible to perform the high-speed electronic watermark extraction as compared with the case where the electronic watermark is extracted from the entire block.

Further, in consideration of the interval at which the electronic watermarks have been previously embedded in the copy prohibition object, the subblocks are set in the present embodiment such that at least one electronic watermark can be extracted irrespective of position and direction of the copy prohibition object. Thus, the present embodiment includes various subblock setting to achieve the above.

The explanation of the second embodiment premises that it is judged and checked in the electronic watermark technique whether or not the image read by the color image scanner corresponds to the copy prohibition object.

However, such the image is not limited to the color image input by the color image scanner. For example, the image which is judged to correspond to the copy prohibition object includes the image which is input through I/F 0323 for the communication means such as a network or the like, or the image which is obtained by capturing color image data from a detachable storage medium (e.g., a smart media, CompactFlash™, or a magnetooptical disk) installed to a dedicated drive connected to the image processing system. In this case, a copy prohibition object feature check program used in the above is included in a program (e.g., a browser) for achieving the communication means such as the network, or a program for capturing the image from the storage medium.

Figure 13:
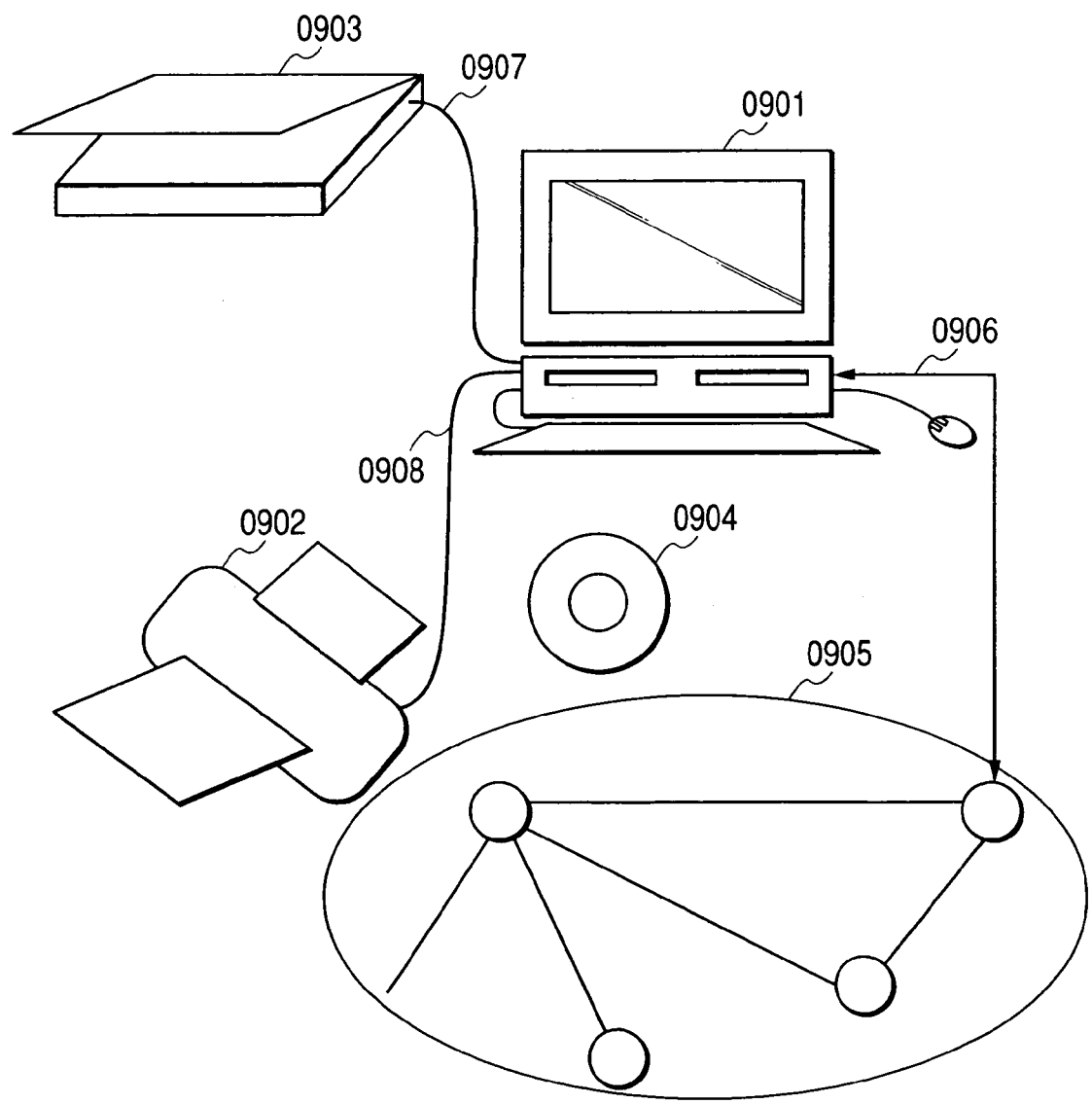
FIG. 13 is a diagram showing an example of the image processing system in the second embodiment.

FIG. 13 shows an environment that copy prohibition object extraction is assumed in the second embodiment.

In FIG. 13, numeral 0903 denotes a color image scanner which acts as an image input apparatus, numeral 0901 denotes a personal computer which acts as a computer system, numeral 0907 denotes a connection cable by which data is exchanged between the color image scanner 0903 and the computer system 0901, numeral 0902 denotes a color printer which acts as an image output apparatus, numeral 0908 denotes a connection cable by which data is exchanged between the color printer 0902 and the computer system 0901, numeral 0904 denotes a detachable external storage medium such as a CD-ROM, numeral 0905 denotes a network such as a LAN, the Internet or the like, and numeral 0906 denotes a connection cable by which data is exchanged between the network 0905 and the computer system 0901.

Figure 14:
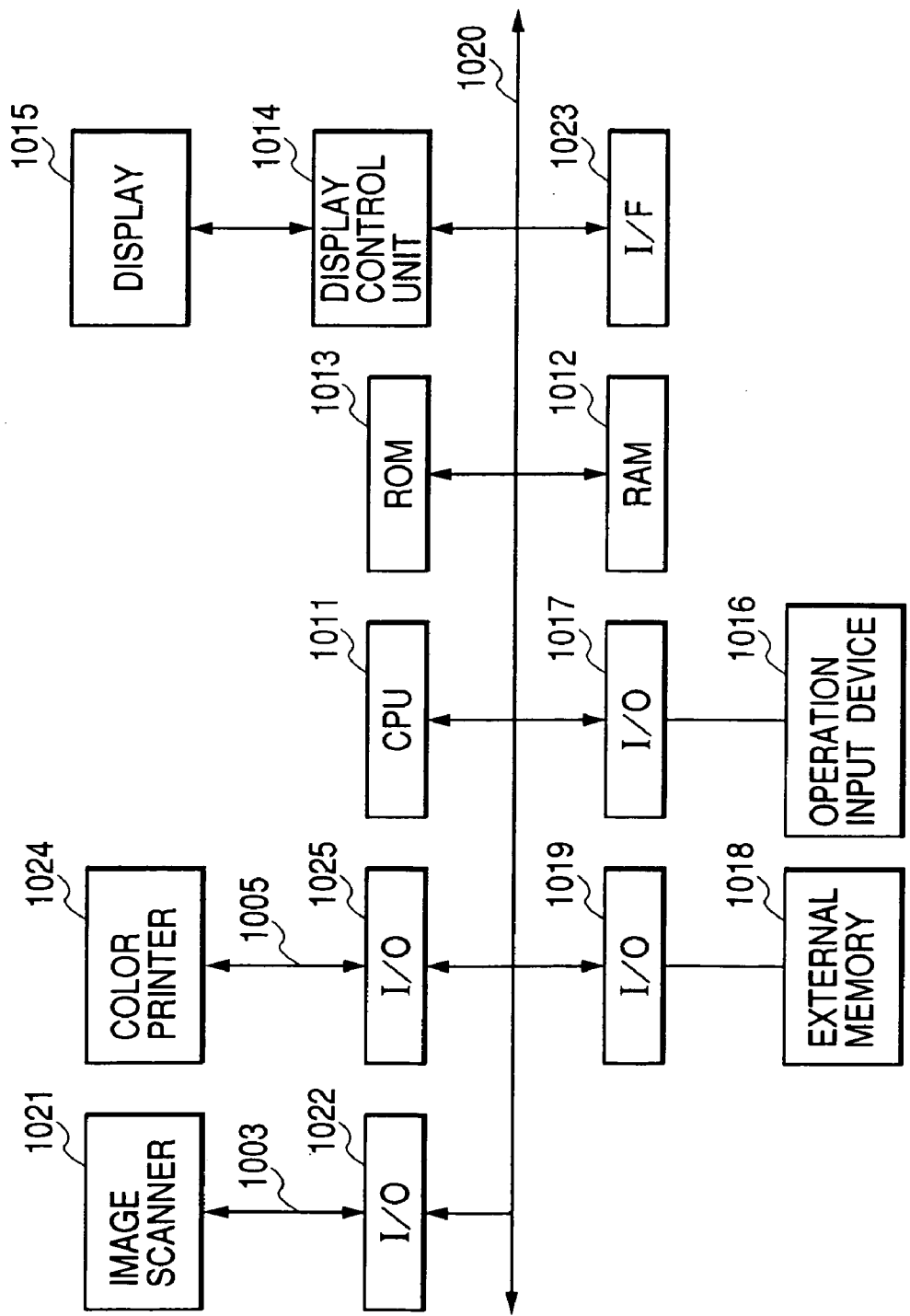
FIG. 14 is a block diagram showing the structure of the main part of FIG. 13.

FIG. 14 is a block diagram showing the main part of the structure of FIG. 13 with blocks acting as function modules. In FIG. 14, numeral 1011 denotes a CPU, numeral 1012 denotes a RAM, numeral 1013 denotes a ROM, numeral 1014 denotes a display control unit, numeral 1015 denotes a display, numeral 1016 denotes an operation input device such as a keyboard or a mouse, numeral 1017 denotes a connection input/output port (I/O) for the operation input device 1016, numeral 1018 denotes an external memory such as a hard disk or the like, numeral 1019 denotes a connection I/O for the external memory 1018, numerals 1003, 1005 and 1020 denote buses, numeral 1021 denotes a color image scanner, numeral 1022 denotes a connection I/O for the image input apparatus such as the image scanner 1021, numeral 1024 denotes a color printer, numeral 1025 denotes a connection I/O for the image output apparatus such as the color printer 1024, and numeral 1023 denotes an interface unit (I/F) for a communication means such as a network or the like.

The second embodiment proposes a system that, when the already-digitized copy prohibition object is input through the external memory or the network, it is judged before the printing output is performed by the color printer whether or not the input object surely corresponds to the copy prohibition object. If judged that the input object surely corresponds to the copy prohibition object, the printing output is stopped, while if judged that the input object does not correspond to the copy prohibition object, the printing is continued.

Figure 18:
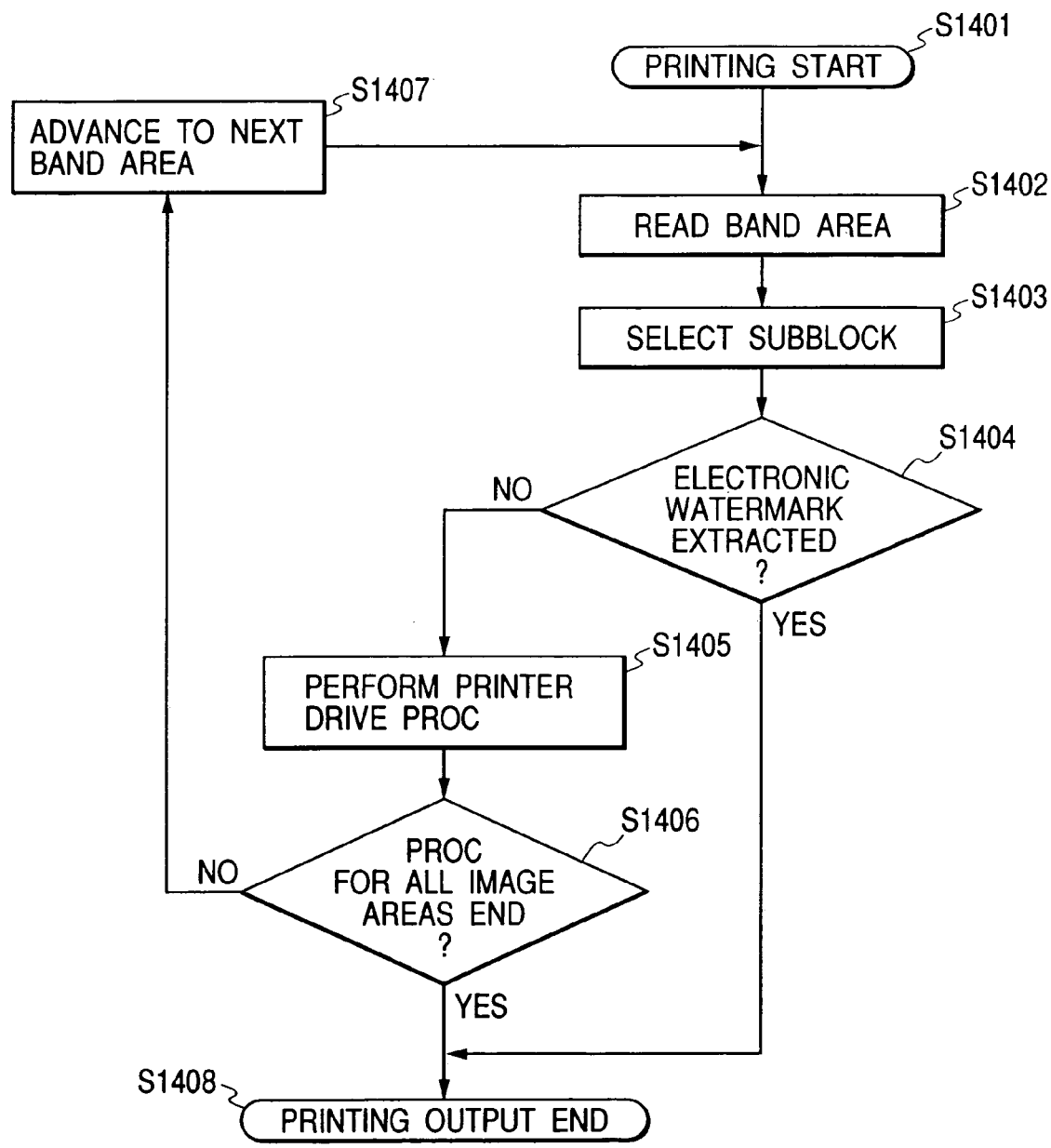
FIG. 18 is a flow chart showing an operation procedure in the second embodiment.

FIG. 18 is a flow chart showing an operation procedure by which the process in the second embodiment is performed on the structures shown in FIGS. 13 and 14. A computer-executable program which describes the procedure shown in FIG. 18 is previously stored in the ROM 1013, and then the stored program is executed by the CPU 1011 to perform the process. Alternatively, a program which has been previously stored in the external memory 1018 is read onto the RAM 1012, and then this program is executed by the CPU 1011 to perform the process.

First, a printer driver process in which the image data input from the color image scanner 0903, the network 0905 and the external memory 0904 to the computer system 0901 is processed and output to the color printer 0902 being the image output apparatus will be explained.

Generally, in a color digital image, one pixel consists of plural color components each having gradation information. For example, in case of R, G and B 24-bit color information, since each of R, G and B components has eight-bit (256 gradations) information, it is possible by one pixel to represent colors of 24 bits (about 16,700,000 colors).

However, the printer (here, an inkjet printer which is most general in the consumer market will be described mainly) creates a color image with inks of C, M, Y and K four colors (or inks pursuant to them, e.g., inks of thin cyan, thin magenta and thin black). In this case, there is only an ON or OFF state in the output of each ink, and it is difficult to add gradation information to an ink dot. For this reason, the gradation of the pixel value is represented as an area based on a quantity and number of ink dots emitted onto the unit area. Thus, a binarization process (a halftone process) which performs color separation of the color image into C, M, Y and K colors and converts density gradation into area gradation is necessary.

Further, since the color reproduction area of a monitor is different from the color reproduction area on a recording sheet, it is necessary to perform color gamut mapping (color matching) such that a reproduction image looks desirable for human eyes.

To perform such the image process for printing as above, the image data in the external memory 1018 or the ROM 1013 is expanded on the RAM 1012, and the above image process is performed by the CPU 1011. Then, as a result of the image process, printer control information is generated and input to the color printer 1024 through the connection I/O 1025. Such a series of processes is the processes to be performed by the printer driver. In this case, it should be noted that the printer driver which has been previously stored in the ROM 1013 or the external memory 1019 is read onto the RAM 1012 and then executed by the CPU 1011.

Figure 15:
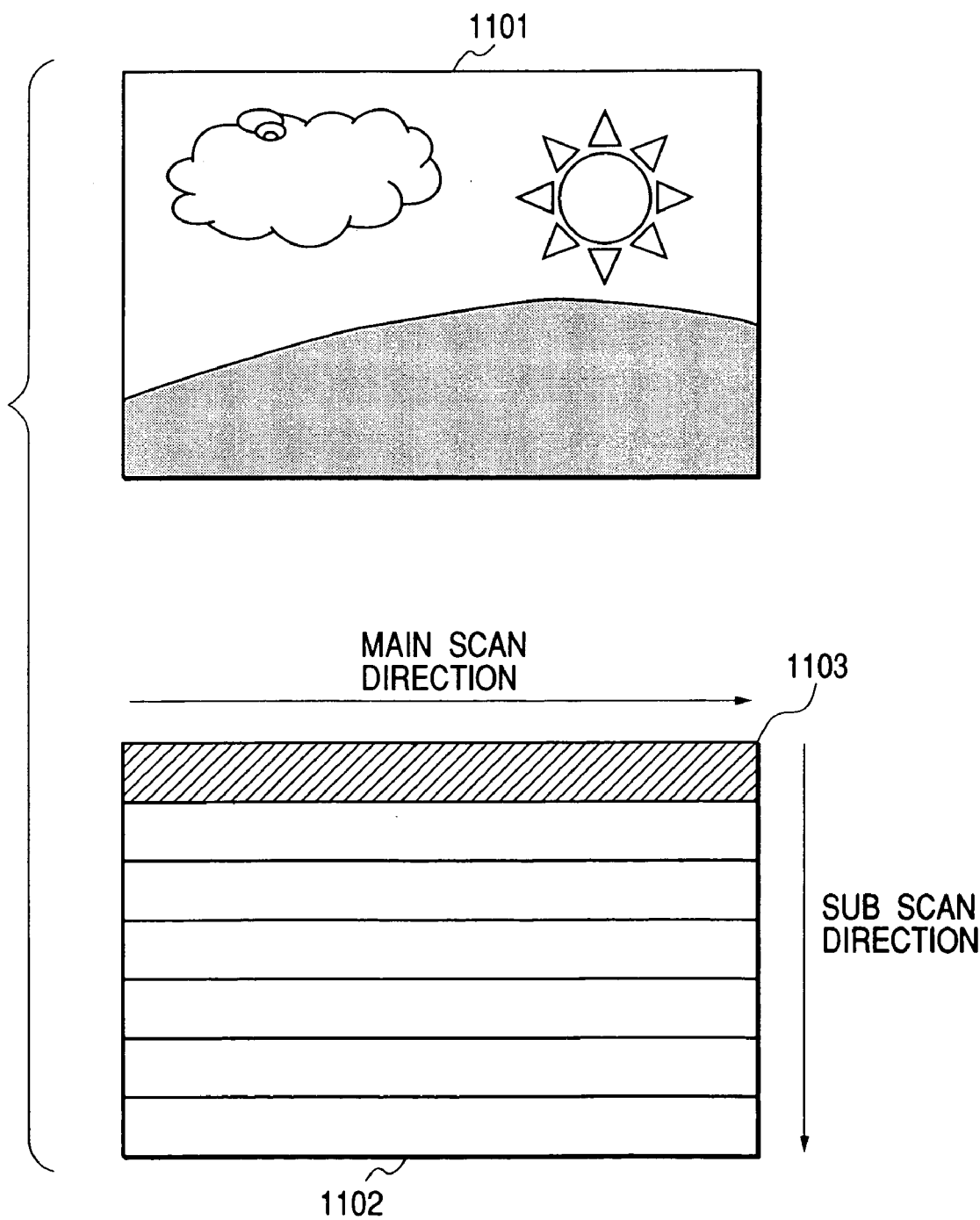
FIG. 15 is a diagram for explaining an image process of a printer driver.

The process by the printer driver will be briefly described with reference to FIG. 15. When an image 1101 is output by the printer, the entire image 1101 is not expanded on the RAM 1012 and processed at a time. Namely, a band area 1103 which has the length of the printer head movement direction (main scan direction) and the width in the sheet feed direction (sub scan direction) corresponds to the unit of one-time process by the printer driver.

However, in case of the binarization process (halftone process), when the information of the previous line such as error information obtained by an error diffusion method or the like is necessary, a buffer area is separately secured to store the error information.

As above, the image 1101 is divided into the plural band areas and expanded on the RAM 1012 by the printer driver, each band area is subjected to the image process by the CPU 1011, and the processed image 1101 is then printed and output.

In the second embodiment, it is judged for each band area of the printer driver whether or not the band area in question corresponds to the copy prohibition object, with the electronic watermark technique. Thus, the method in which it is controlled to normally print and output the copy prohibition object with the printer is proposed.

FIG. 18 is the flow chart showing a series of processes in the second embodiment.

When the printing is started in a step S1401, the image information of the band area is read to the RAM 1012 in a step S1402. In a step S1403, the subblock from which the electronic watermark is extracted is selected from the band area in the RAM 1012. The subblock selection means which selects the subblock from which the electronic watermark is extracted in the step S1403 will be later explained in detail. Then, in a step S1404, the electronic watermark is actually extracted from the area for the electronic watermark extraction. As a result of the electronic watermark extraction, if it is judged that the image in question corresponds to the copy prohibition object, the flow advances to a step S1408 to immediately stop the printing and output. It should be noted that to stop the printing and output represents either to stop the printing or to stop the normal printing (i.e., not to produce a faithful print but to produce a solid black print or a screen print). Also in this case, a message such as "copy prohibition image is unprintable" or the like is displayed to notify a user why the normal printing is not performed.

On the other hand, if it is judged that the image in question does not correspond to the copy prohibition object, the flow advances to a step S1405 to perform the ordinary printer driver process. Then, in a step S1406, if the printing of the entire image area ends, the flow advances to the step S1408 to end the printing. Conversely, if the printing of the entire image area does not end, the flow advances to a step S1407 to perform the process for the next band area.

Figure 16:
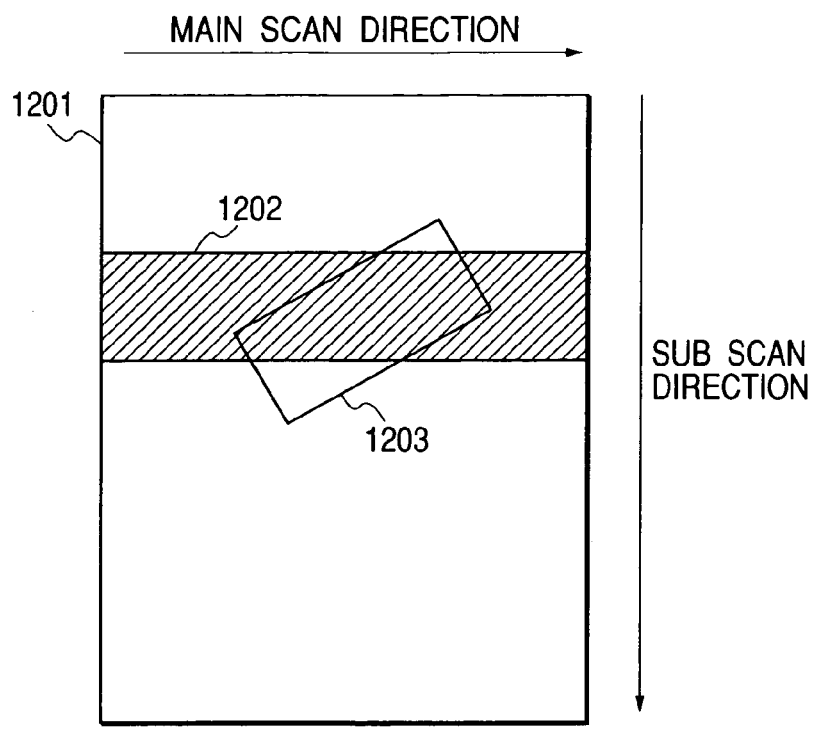
FIG. 16 is a diagram for explaining detection of a copy prohibition object in the second embodiment.
Figure 17:
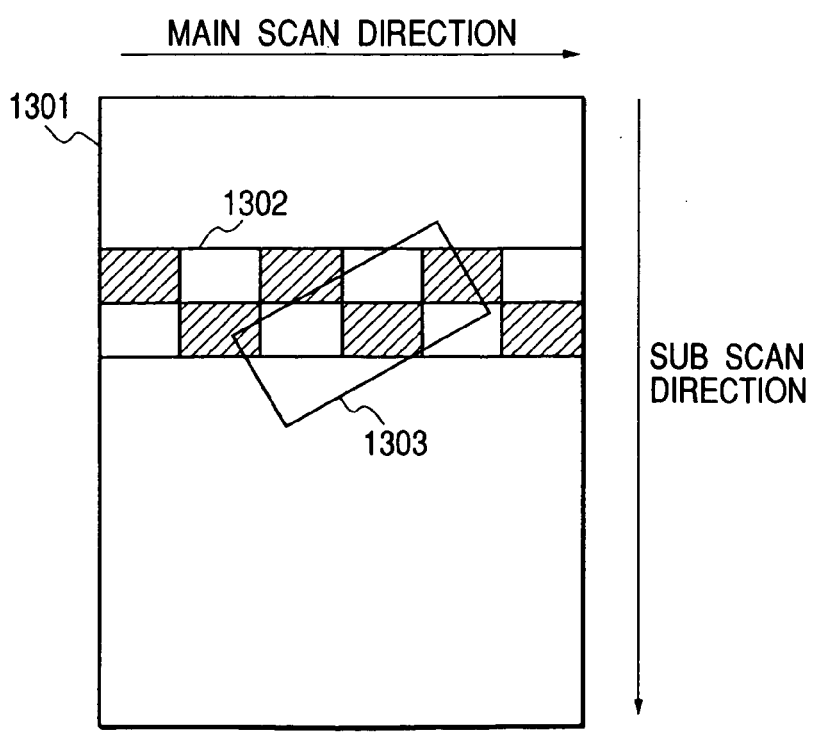
FIG. 17 is a diagram for explaining efficient detection of the copy prohibition object in the second embodiment.

FIG. 16 shows an example that digital image data 1201 including a copy prohibition object 1203 is output by the printer 0902.

When the printer driver process reaches a band area 1202, since a part of the copy prohibition object 1203 is included in the band area 1202, it is possible in the electronic watermark extraction process to judge that the image in question corresponds to the copy prohibition object.

However, when the electronic watermark extraction process is performed from the entire band area 1202, it is thought that process speed of the printer driver greatly decreases.

Therefore, the subblock selection means used in the step S1403 selects the subblocks in the following cases like the first embodiment. Namely, in the band area from which the electronic watermark should be extracted, the case where the subblocks are arranged like checkers, the case like the case 0801 in FIG. 12 where the subblocks are arranged at the certain interval "a" in the main scan direction and the certain interval "b" in the sub scan direction, and the case like the case 0802 in FIG. 12 where the subblocks are arranged at random are supposed. Thus, it is judged whether or not the image in question is the copy prohibition object, the printing can be controlled according to the judged result, and simultaneously the decrease in printer driver speed can be prevented as much as possible.

The present embodiment is not limited to such the methods as above. Namely, the present embodiment also includes various kinds of methods in which the subblocks used for electronic watermark extraction are dispersedly arranged to be suitable to extract the electronic watermark intended to be extracted, it is judged based on such the arrangement whether or not the image in question corresponds to the copy prohibition object, the printing is controlled according to the judged result, and simultaneously the decrease in printing speed is prevented as much as possible.

Incidentally, the above electronic watermark extraction capable of decreasing the printing speed is suitable for a printer (driver) in which short printing time is an important selling point.

A processing method in which a program to operate the structure of the embodiment for realizing the function of the embodiment is stored in a storage medium, the program stored in the storage medium is read as a code and then executed by a computer is also included in the scope of the present embodiment. Further, the storage medium which stores such the program is included in the present embodiment.

As such the storage medium, for example, it is possible to use a floppy disk, a hard disk, an optical disk, a magnetooptical disk, a CD-ROM, a magnetic tape, a non-volatile memory card, a ROM, or the like.

Further, the present embodiment includes not only the case where the program itself stored in the storage medium performs the process, but also a case where the program cooperates with other software or a function of an expansion board on an operating system (OS) to perform the operation of the embodiment.

As above, according to the present invention, it is possible to perform the specific image judgment process with a relatively small operation capacity.

Further, by selecting the subblocks at the certain period like the checkers, it is possible to make the accuracy in the selection equal for the entire image.

Further, it is possible to select the subblock from which the periodically arranged feature can be easily extracted.

Further, it is possible to extract the feature even if the direction and the position of the input image are variable.

Further, when the input image is judged to be the specific image, it is possible to stop inputting such the image. For example, it is possible to prevent from illegally or falsely inputting an input-prohibited image such as an image corresponding to a security.

Further, the specific image judgment means extracts the electronic watermark from the input image, and judges whether or not the input image corresponds to the specific image. Thus, it is possible to make the information for judging the specific image in the input image not to be easily seen by human eyes, or to be invisible information, whereby high security can be achieved.

When the judged result of the specific image judgment means or the input image is the specific image, since the printer driver process for the input image is not performed, it is possible to prevent from printing the copy prohibition image.

Further, since the judged result of the specific image judgment means is displayed, it is possible to notify the user of the state of the apparatus.

Although the present invention has been explained with the preferred embodiments, the present invention is not limited to the above embodiments. Namely, it is obvious that various modifications and changes are possible in the present invention without departing from the spirit and scope of the appended claims.

What is claimed is:

1. An image processing method comprising:
   an input step of sequentially inputting image data corresponding to plural partial areas obtained by a dividing one-page image;
   a judgement step of judging whether the input image data corresponds to a margin area or a non-margin area;
   a detection step of detecting whether or not the image data corresponding to the non-margin area represents at least a part of a specific image; and
   a control step of controlling printing output of the image data corresponding to the non-margin area, in accordance with the detected result in said detection step,
   wherein when a ratio of margin pixels included in the image represented by the input image data is equal to or larger than a predetermined value, said judgement step judges that the input image data corresponds to the margin area.

2. A method according to claim 1, wherein each partial area corresponds to a respective band obtained by dividing the one-page image into strip-shaped bands, and the printing output is performed one band at a time.

3. An image processing method comprising:
   an input step of sequentially inputting image data corresponding to plural partial areas obtained by dividing a one-page image;
   a judgement step of judging whether the input image data corresponds to a margin area or a non-margin area;
   a detection step of detecting whether or not the image data corresponding to the non-margin area represents at least a part of a specific image; and
   a control step of controlling printing output of the image data corresponding to the non-margin area, in accordance with the detected result in said detection step,
   wherein said detection step detects whether or not predetermined electronic watermark information has been embedded in the image data corresponding to the non-margin area.

4. A method according to claim 3, wherein each partial area corresponds to a respective band obtained by dividing the one-page image into strip-shaped bands, and the printing output is performed one band at a time.

5. A storage medium which computer-readably stores a program including:
   an input step of sequentially inputting image data corresponding to plural partial areas obtained by dividing a one-page image;
   a judgment step of judging whether the input image data corresponds to a margin area or a non-margin area;
   a detection step of detecting whether or not the image data corresponding to the non-margin area represents at least a part of a specific image; and
   a control step of controlling printing output of the image data corresponding to the non-margin area, in accordance with the detected result in said detection step,
   wherein when a ratio of margin pixels included in the image represented by the input image data is equal to or larger than a predetermined value, said judgement step judges that the input image data corresponds to the margin area.

6. An image processing apparatus comprising:
   input means for sequentially inputting image data corresponding to plural partial areas obtained by dividing a one-page image;
   judgment means for judging whether the input image data corresponds to a margin area or a non-margin area;
   detection means for detecting whether or not the image corresponding to the non-margin are represents at least a part of a specific image; and
   control means for controlling printing output of the image data corresponding to the non-margin area, in accordance with the detected result of said detection means,
   wherein when a ratio of margin pixels included in the image represented by the input image data is equal to or larger than a predetermined value, said judgement means judges that the input image data corresponds to the margin area.

7. An image processing method comprising:
   an input step of inputting image information according to an image;
   a block selection step of selecting, in the image information input in said input step, the image information of a block having a predetermined size;
   a specific image judgment step of judging whether or not the input image corresponds to a specific image having a predetermined feature, in accordance with the image information of the block; and
   a process step of processing the input image in accordance with the judged result in said specific image judgement step,
   wherein said block selection step selects the blocks arranged at random positions.

8. A method according to claim 7, wherein said block selection step selects the blocks arranged at dispersed positions.

9. A method according to claim 7, wherein said block selection step selects the blocks arranged at a certain interval.

10. A method according to claim 7, wherein, when it is judged in said specific image judgment step that the input image corresponds to the specific image, said process step stops inputting of the image.

11. A method according to claim 7, wherein said specific image judgment step judges whether or not the input image corresponds to the specific image, by extracting an electronic watermark of the input image with a software process.

12. A method according to claim 7, wherein the image is input by a flatbed scanner.

13. A method according to claim 7, wherein, when it is judged in said specific image judgment step that the input step image corresponds to the specific image, said process step does not perform a printer driver process to the input image.

14. A method according to claim 7, wherein said process step displays the judged result in said specific image judgment step.

15. A method according to claim 7, wherein the blocks are selected like checkers.

16. An image processing method comprising:
an input step of inputting image information according to an image;
a block selection step of selecting, in the image information input in said input step, the image information of a block having a predetermined size;
a specific image judgment step of judging whether or not the input image corresponds to a specific image having a predetermined feature, in accordance with the image information of the block; and
a process step of processing the input image in accordance with the judged result in said specific image judgement step,
wherein said input step inputs the image information of a band area having a predetermined size from the image, and said block selection step selects the image information of the block having the predetermined size within the band area.

17. A method according to claim 16, wherein said block selection step selects the blocks arranged at dispersed positions.

18. A method according to claim 16, wherein said block selection step selects the blocks arranged at a certain interval.

19. A method according to claim 16, wherein, when it is judged in said specific image judgment step that the input image corresponds to the specific image, said process step stops inputting of the image.

20. A method according to claim 16, wherein said specific image judgment step judges whether or not the input image corresponds to the specific image, by extracting an electronic watermark of the input image with a software process.

21. A method according to claim 16, wherein the image is input by a flatbed scanner.

22. A method according to claim 16, wherein, when it is judged in said specific image judgment step that the input step image corresponds to the specific image, said process step does not perform a printer driver process to the input image.

23. A method according to claim 16, wherein said process step displays the judged result in said specific image judgment step.

24. A method according to claim 16, wherein the blocks are selected like checkers.

25. A storage medium which computer-readably stores a program including:
an input step of inputting image information according to an image;
a block selection step of selecting, in the image information input in said input step, the image information of a block having a predetermined size;
a specific image judgment step of judging whether or not the input image corresponds to a specific image having a predetermined feature, in accordance with the image information of the block; and
a process step of processing the input image in accordance with the judged result in said specific image judgment step,
wherein said block selection step selects the blocks arranged at random positions.

26. An image processing apparatus comprising:
input means for inputting image information according to an image;
block selection means for selecting, in the image information input by said input means, the image information of a block having a predetermined size;
specific image judgment means for judging whether or not the input image corresponds to a specific image having a predetermined feature, in accordance with the image information of the block; and
process means for processing the input image in accordance with the judged result of said specific image judgment means,
wherein said block selection means selects the blocks arranged at random positions.

27. A storage medium which computer-readably stores a program including:
an input step of sequentially inputting image data corresponding to plural partial areas obtained by dividing a one-page image;
a judgment step of judging whether the input image data corresponds to a margin area or a non-margin area;
a detection step of detecting whether or not the image data corresponding to the non-margin area represents at least a part of a specific image; and
a control step of controlling printing output of the image data corresponding to the non-margin area, in accordance with the detected result in said detection step,
wherein said detection step detects whether or not predetermined electronic watermark information has been embedded in the image data corresponding to the non-margin area.

28. An image processing apparatus comprising:
input means for sequentially inputting image data corresponding to plural partial areas obtained by dividing a one-page image;
judgment means for judging whether the input image data corresponds to a margin area or a non-margin area;
detection means for detecting whether or not the image corresponding to the non-margin area represents at least a part of a specific image; and
control means for controlling printing output of the image data corresponding to the non-margin area, in accordance with the detected result of said detection means,
wherein said detection step detects whether or not predetermined electronic watermark information has been embedded in the image data corresponding to the non-margin area.

29. A storage medium which computer-readably stores a program including:
an input step of inputting image information according to an image;
a block selection step of selecting, in the image information input in said input step, the image information of a block having a predetermined size;
a specific image judgment step of judging whether or not the input image corresponds to a specific image having a predetermined feature, in accordance with the image information of the block; and a process step of processing the input image in accordance with the judged result in said specific image judgment step, wherein said input step inputs the image information of a band area having a predetermined size from the image, and said block selection step selects the image information of the block having the predetermined size within the band area.

30. An image processing apparatus comprising:

input means for inputting image information according to an image;

block selection means for selecting, in the image information input by said input means, the image information of a block having a predetermined size;

specific image judgment means for judging whether or not the input image corresponds to a specific image having a predetermined feature, in accordance with the image information of the block; and process means for processing the input image in accordance with the judged result of said specific image judgment means, wherein said input means inputs the image information of a band area having a predetermined size from the image, and said block selection means selects the image information of the block having the predetermined size within the band area.

* * * * *

UNITED STATES PATENT AND TRADEMARK OFFICE
CERTIFICATE OF CORRECTION

| | | |
|---|---|---|
| PATENT NO. | : 7,006,257 B1 | |
| APPLICATION NO. | : 09/713235 | |
| DATED | : February 28, 2006 | |
| INVENTOR(S) | : Yamazaki et al. | |

It is certified that error appears in the above-identified patent and that said Letters Patent is hereby corrected as shown below:

ON THE COVER PAGE
At Item (57), Abstract, line 5, "corresponding" should read --corresponding to--.

COLUMN 1
Line 20, "the" should read --a--.
Line 54, "the" (second occurrence) should read --an--.

COLUMN 2
Line 3, "the" should read --an--.
Line 41, "corresponding" should read --corresponding to--.
Line 50, "corresponding" should read --corresponding to--.

COLUMN 4
Line 14, "the" (second occurrence) should be deleted.
Line 29, "the" should read --an--.
Line 48, "the" should read --a--.

COLUMN 6
Line 3, "the" should read --a--.
Line 6, "the" (first occurrence) should be deleted.

COLUMN 7
Line 42, "the" (second occurrence) should read --a--.

COLUMN 9
Line 3, "the" (first occurrence) should read --an--.
Line 30, "the" should read --a--.

COLUMN 11
Line 10, "the" (second occurrence) should be deleted.
Line 15, "the" should read --an--.
Line 37, "the" (first occurrence) should read --an--.

COLUMN 13
Line 4, "the" should read --an--.

UNITED STATES PATENT AND TRADEMARK OFFICE
CERTIFICATE OF CORRECTION

PATENT NO. : 7,006,257 B1
APPLICATION NO. : 09/713235
DATED : February 28, 2006
INVENTOR(S) : Yamazaki et al.

It is certified that error appears in the above-identified patent and that said Letters Patent is hereby corrected as shown below:

COLUMN 14
Line 27, "the" (second occurrence) should be deleted.
Line 32, "the" should read --an--.
Line 47, "the" (first occurrence) should read --a--.
Line 49, "such" should read --such for--.

COLUMN 15
Line 4, "the" should read --an--.
Line 18, "copy prohibition" should read --copy-prohibited--.
Line 34, "judgement" should read --judgment--.
Line 44, "judgement" should read --judgment--.
Line 55, "judgement" should read --judgment--.

COLUMN 16
Line 20, "judgement" should read --judgment--.
Line 30, "are" should read --area--.
Line 37, "judgement" should read --judgment--.
Line 51, "judgement" should read --judgment--.

COLUMN 17
Line 26, "judgement" should read --judgment--.

Signed and Sealed this

Twenty-fourth Day of October, 2006

JON W. DUDAS
*Director of the United States Patent and Trademark Office*